United States Patent Office 3,268,800
Patented August 23, 1966

3,268,800
NUCLEAR MAGNETIC RESONANCE
WELL LOGGING
Gustave L. Hoehn, Jr., Donald E. Woessner, and John R.
Zimmerman, Jr., Dallas, Tex., assignors to Mobil Oil
Corporation, a corporation of New York
Continuation of application Ser. No. 12,119, Mar. 1, 1960.
This application May 8, 1964, Ser. No. 366,114
12 Claims. (Cl. 324—.5)

This application is a continuation of application Serial No. 12,119, filed March 1, 1960, now abandoned.

This invention relates to nuclear magnetic resonance and more particularly to the determination of the character of materials subject to nuclear precession in the earth's magnetic field. In a more specific aspect, the invention relates to nuclear magnetic induction well logging.

Various parameters of formations penetrated by a borehole have been extensively studied in order to characterize both the formations and the fluids contained therein. Many operations in connection with the recovery of deposits of both liquid and solid from such formations are based upon logs thus produced.

Nuclear magnetic induction processes have been found adequate to provide a basis for distinguishing between oil and water. Such an indication is of significance in connection with completion of an oil well, for example, where other logging methods fail to provide a direct indication of the nature of fluids in a permeable formation.

The present invention is directed to an improvement in nuclear magnetic well logging procedures and more particularly to the measurement of nuclear precession in the earth's magnetic field in a manner independent of field inhomogeneity. A further aspect of the invention involves measurement of the diffusion constant of liquids in formations in the earth's magnetic field.

More particularly, there is provided a method for logging earth formations where a polarization condition of fluids within and surrounding a wellbore is repeatedly established and interrupted to permit protons to precess as an ensemble under the influence of the earth's magnetic field. The method includes applying to the precessing protons alternating magnetic fields following the establishment of each polarization condition. By this means, there is successively altered in at least two different degrees the phase relations between individuals in the proton ensemble. A measurement is then made of a characteristic of the relaxation time of the protons within and surrounding the wellbore after removal of the alternating magnetic fields.

In a more specific aspect, there is provided a system for logging a wellbore in which nuclei are initially polarized in a strong magnetic field and then upon an abrupt change in the magnetic field are freed for precession as an ensemble in the earth's magnetic field. The system includes means for generating a control function a predetermined time interval after the abrupt change in the strong magnetic field for energizing a system to apply an alternating magnetic field to the precessing protons. The alternating magnetic field has a frequency corresponding with that of the precession of the nuclei in the earth's magnetic field and is maintained for a period at least sufficient to alter the precessing system. A measuring means is provided responsive to the amplitude of the precessing field following removal of the alternating field. The resultant measurements preferably are registered in accordance with depth in the wellbore, thereby to provide an index as to the character of the fluids therein.

In accordance with a further aspect of the invention, there is provided a nuclear magnetic well logging method in which precession of nuclei in the earth's magnetic field is detected at each of a plurality of depths in a wellbore. A low-amplitude unidirectional magnetic field having a substantial gradient is superimposed on the earth's magnetic field to produce a gradient in the sum thereof. Nuclear precession signals are then detected in the total magnetic field and indications of such precession are registered in correlation of the depths at which said signals are detected.

In a more specific aspect of the invention, there is provided a well logging system in which means are provided for superimposing a high-amplitude magnetic field on the earth's magnetic field to polarize nuclei therein. Means for detecting oscillatory fields is then provided in close proximity to each of the polarizing means. A second field means is provided for applying a low-amplitude unidirectional magnetic field having orientation generally the same as the earth's magnetic field and the effect on said oscillatory signals is detected.

For further objects and advantages of the invention, reference may now be had to the following description taken in conjunction with the accompanying drawings in which.

In the following description it will be helpful to keep in mind that attention is directed toward nuclear magnetic resonance measurements in the earth's magnetic field, which measurements are free from ambiguities heretofore encountered. More particularly, measurements are made of longitudinal relaxation time $T_1$ and transverse relaxation time $T_2$ even though there may be substantial inhomogeneity in the earth's magnetic field. Further, attention is directed toward the measurement of such relaxation times under conditions wherein the magnetic field gradient is caused to vary in order that the diffusion constant of the materials comprising the precessing nuclei may be determined.

Figure 1:
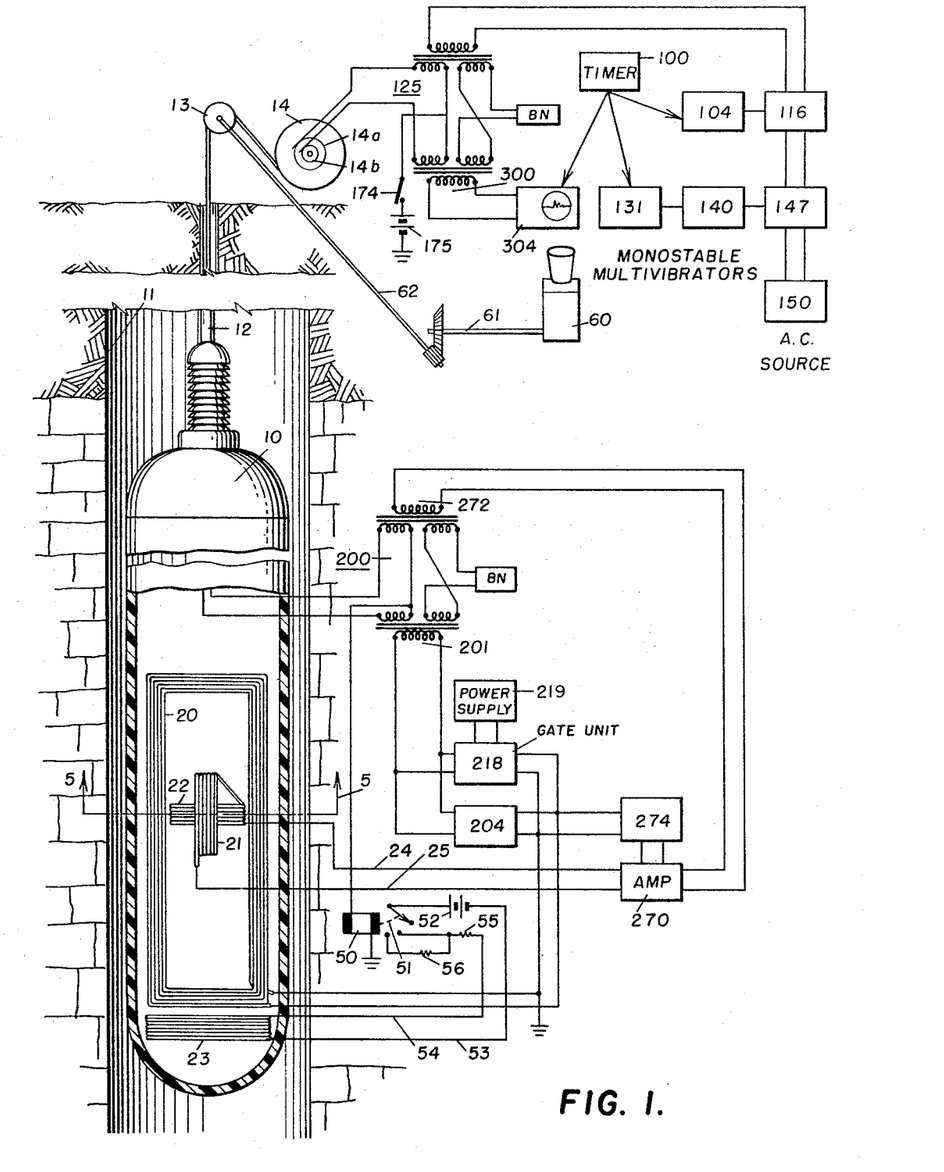
FIG. 1 is a diagrammatic representation of the present invention shown partially in block form with the borehole tool shown partially in section.

In FIG. 1, there is illustrated a well logging system in which an exploring unit 10 is supported in a borehole 11 by means of a cable 12. Cable 12 is threaded over a surface sheave 13 and is wound onto and off from a power-driven reel 14 to raise and to lower unit 10 in borehole 11. The borehole unit 10 comprises an elongated cylindrical housing, at least a portion of which is of nonmagnetic materials. In that portion characterized by nonmagnetic materials, there is housed a field coil 20 which is of substantial length and is of generally rectangular configuration though otherwise wound to best utilize the volume of the cylindrical housing of the unit 10. A pair of detector coils 21 and 22 are positioned within the housing of unit 10 and preferably at the center of coil 20. Coils 20, 21, and 22 are so wound and mounted as to be oriented orthogonally one with respect to the other. Coils 21 and 22 are connected in series opposition so that the difference between voltages induced therein will appear on output conductors 24 and 25. A fourth coil 23 is provided within the housing or unit 10 and is oriented with its axis corresponding with the axis of unit 10.

Figures 2, 5:
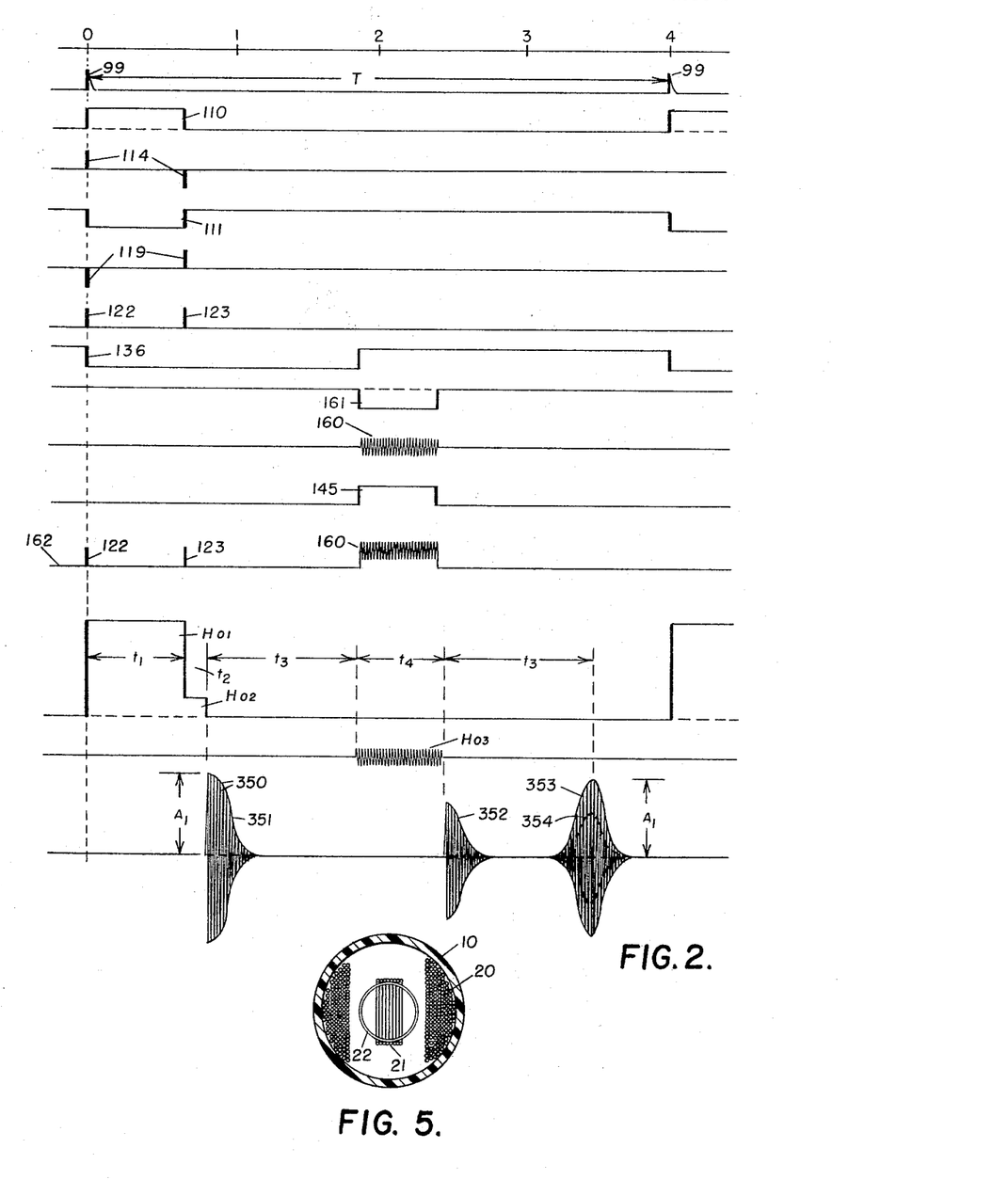
FIG. 2 includes a series of time functions representative of the operation of the system of FIG. 1.
FIG. 5 is a sectional view taken on the lines 5—5 of FIG. 1.

In the sectional view of FIG. 5, the orientation of coils 20–22 is illustrated. The crossed-coil detector system 21, 22 is advantageous in all cases except when the earth's magnetic field is dipping at an angle of 45°. At 45°, the voltages induced in coils 21 and 22 would be equal. In general, however, this identity between the voltages will not be encountered and the orthogonal orientation of coils maintains at a minimum the induction of signals from the field coil 20. As illustrated in FIG. 5, the housing for the coil system is of nonmagnetic material. When employing such a system at substantial depths where high pressures are encountered, a stainless steel housing will be found desirable in order to withstand the pressures encountered and at the same time provide a nonmagnetic casing.

In operation the coils 20 and 23 are energized and utilized to induce magnetic fields in the formations adjacent borehole 10. Coils 21 and 22 are utilized to detect resultant magnetic fields to provide new information as to the character of the formations and of fluids contained therein. In the embodiment of the invention illustrated, the operations are adapted to be controlled from the earth's surface. The control system is connected to the conductors in cable 12 anchored on the reel 14.

The operation is controlled primarily by a timer 100 which produces a control pulse such as pulse 99, FIG. 2, every few seconds. As illustrated in FIG. 2, pulses 99 are recurrent every four seconds. Timer 100 applies control pulses to a monostable multivibrator 131 which in turn is connected to a monostable multivibrator 140. The output of multivibrator 140 is connected to control a gate 147. A source of alternating current 150 is connected by way of gate 147 to an adder circuit 116 whose output is connected to a hybrid coil system 125. Coil system 125 provides a phantom circuit leading downhole over conductors in cable 12 by way of slip-rings 14a and 14b on drum 14. A source of current such as battery 175 is connected by way of a switch 174 into the network of hybrid coil 125 for transmission of unidirectional current downhole to the coil 23. Timer 100 also applies a control pulse to a monostable multivibrator 104 whose output is applied to adder circuit 116. The operation of surface units thus far described provides for application to cable 12 of three voltage functions, pulses 122, 123, and a pulse 160 of alternating current as illustrated in FIG. 2. A more detailed operation of circuit will be presented in connection with the description of FIGS. 3 and 4.

The conductors of cable 12 are connected in the borehole unit 10 to a downhole hybrid coil system 200. Down-going signals are applied from a winding 201 to a gate unit 218 which serves to control flow of unidirectional current from a power supply 219 to the coil 20. Down-going signals are also applied to coil 20 by way of buffer amplifier 204. Unidirectional current from a source such as a battery 175 at the surface flows through the relay coil 50 upon closure of switch 174 to actuate the contact arm of a stepping relay 51 which is located downhole. The contact arm of relay 51 is connected by way of battery 52 and conductor 53 to one terminal coil 23. The other terminal of coil 23 is connected by way of conductor 54 and resistance 55 to a second terminal of the relay 51. The second terminal of relay 51 is connected by way of resistance 56 to a third terminal of relay 51. Upon each closure of switch 174, the contact arm of relay 51 is moved sequentially from one of its associated terminals to another. At the second terminal, current of relatively large magnitude flows from battery 52 to coil 23. When connected to the third terminal of relay 51, current of relatively smaller magnitude flows from battery 52 to coil 23.

Coils 21 and 22 are connected to a gain controlled amplifier 270 whose output is applied by way of winding 272 to the hybrid coil 200 for transmission to the surface of signals detected by coils 21 and 22. Amplifier 270 is provided with a gain control circuit 274. Control circuit 274 is connected to the outputs of both the gating unit 218 and the amplifier 204 so that amplifier 270 is either cut off or the gain is greatly suppressed during the time interval that coil 20 is energized. Signals will be passed by amplifier 270 only when coil 20 is not energized.

Signals transmitted uphole from amplifier 270 are applied by way of winding 300 of hybrid coil 125 to a suitable registering unit such as an oscilloscope 304. A recording means such as camera 60 is provided for recording the signals presented on the face of the oscilloscope 304. The camera 60 is coupled by shafts 61 and 62 to the sheave 13 so that recordings made in camera 60 may be calibrated or otherwise related to the depth of the borehole unit 10 for any given measurement.

Figure 3:
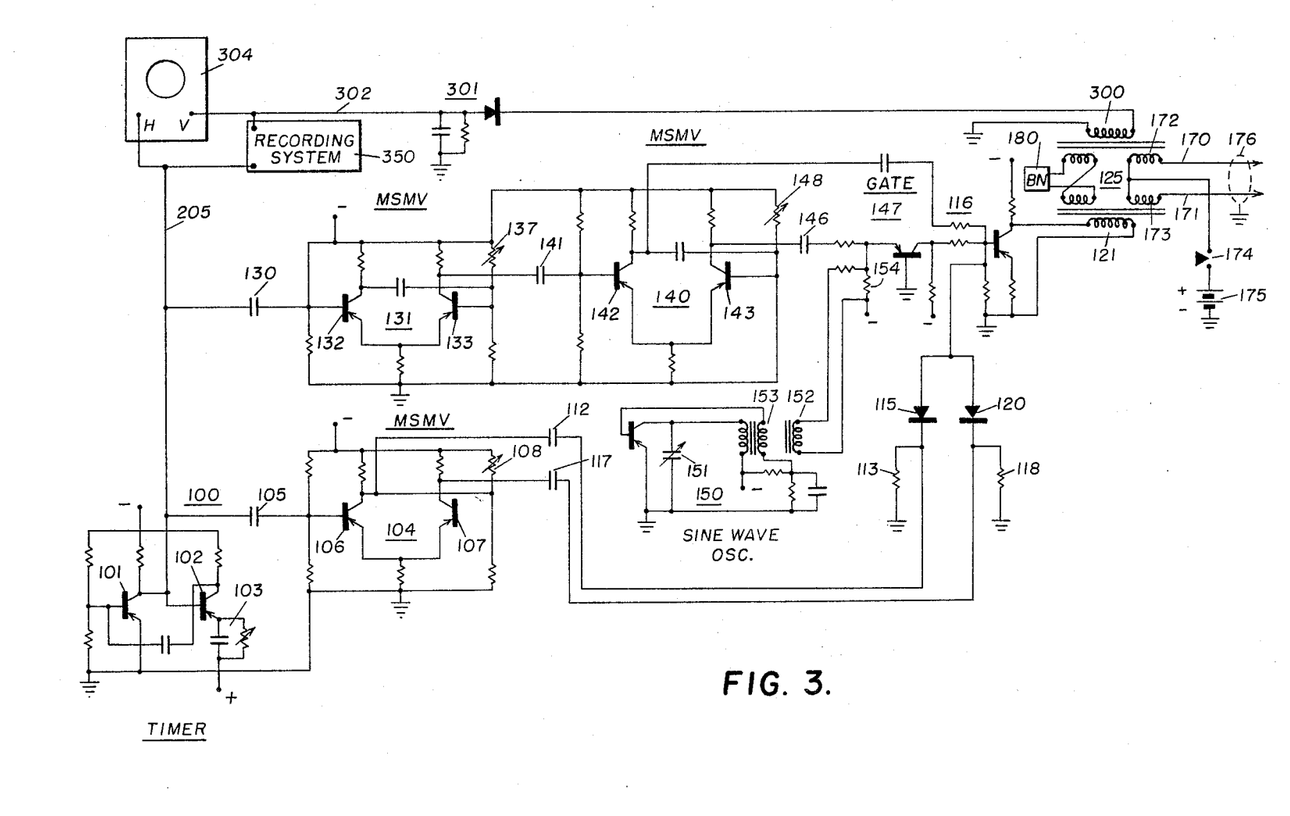
FIG. 3 is a detailed circuit diagram of the surface portion of the system shown in FIG. 1.
Figure 4:
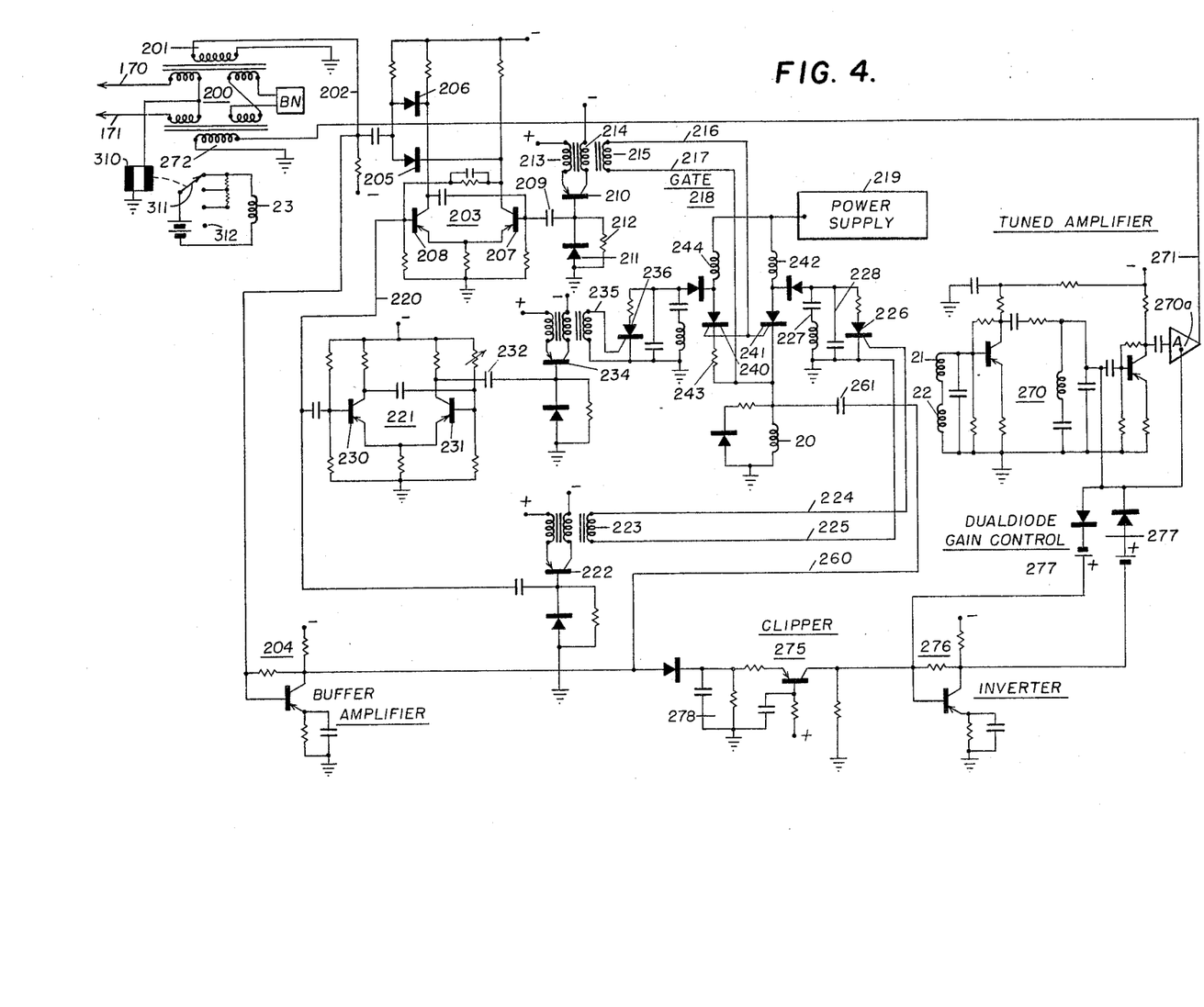
FIG. 4 is a detailed circuit diagram of the subsurface portion of the system shown in FIG. 1.

The various time-voltage functions illustrated in FIG. 2 should now be considered in connection with the following detailed description of the circuits of FIGS. 3 and 4. Where it is consistent, the same reference characters have been used in FIGS. 3 and 4 as in FIG. 1.

Referring now to FIG. 3, timer 100 consists of triodes 101 and 102 shown in transistor form. The timer multivibrator 100 operates in a manner well known to those skilled in the art and is free-running, having in the emitter circuit of triode 102 an RC circuit 103 which provides a long-time constant for multivibrator 100. The time sequence is illustrated in FIG. 2. The time interval T between pulses 99, of the order of seconds in length, is representative of the time constant of the RC circuit 103. By selecting the values of the RC circuit 103, the value of the time interval T can be varied as desired.

The output from the collector of triode 101 is applied to a monostable multivibrator 104 by way of condenser 105. Monostable multivibrator 104 includes triodes 106 and 107. The time constant of the monostable multivibrator 104 is controlled by resistor 108. Thus, there appears at the collector of triode 106 a positive square wave voltage 110, FIG. 2, beginning coincident in time with the pulse 99 from timer 100 and having a duration controlled by resistance 108. Simultaneously, a negative square wave voltage 111, FIG. 2, is produced at the collector of triode 107. The square wave voltage 110, FIG. 2, is differentiated by means of condenser 112 and resistance 113 to produce the waveforms 114, FIG. 2. Rectifier 115 passes only the negative-going pulse of waveforms 114 to an adding circuit 116. The negative pulse 111 is differentiated by condenser 117 and resistance 118 to produce the waveforms 119, FIG. 2. The negative pulse of waveforms 119 is transmitted by way of rectifier 120 to the adding circuit 116. Thus, there is applied to the input winding 121 of the uphole hybrid coil 125 a pair of positive pulses 122 and 123, inversion of polarities of the pulses having been accomplished in the triode forming a part of adding circuit 116.

The output pulse 99, FIG. 2, from timer 100 is also applied by way of condenser 130 to the input of a monostable multivibrator 131, having triodes 132 and 133 therein. A negative-going, square wave output voltage 136, FIG. 2, is developed at the collector of triode 133. The length of pulse 136 is controlled by resistor 137. The pulse 136 is applied to a monostable multivibrator 140 by way of condenser 141. The trailing edge of pulse 136 is employed to trigger multivibrator 140 which includes triodes 142 and 143. A positive-going square wave voltage 145, FIG. 2, developed at the collector of triode 143 is applied by way of condenser 146 to a gating circuit 147. The duration of pulse 145 may be varied under the control of resistor 148. There is also applied to the gating circuit 147 a sign wave voltage 160 generated in an oscillator 150. The frequency of the output signal from the oscillator 150 may be varied under the control of a condenser 151. The output from oscillator 150 is developed across the tertiary winding 152 of the oscillator transformer 153. The output from tertiary winding 152 is applied across resistor 154 in the input of the gate circuit 147. Thus, there is applied to the emitter of the triode in gate 147 a positive-going voltage pedestal upon which there is superimposed the A.C. signal from oscillator 150. The waveforms of the voltages as they appear at the collector of the triode in gate 147 are illustrated along line 162. It is required that the voltage 145, FIG. 2, be of sufficient amplitude to turn the gate 147 on but that the voltage from oscillator 150 be insufficient for this purpose. By this means, it is assured that the alternating signal from oscillator 150 will pass through gate 147 only during application of the square waveform 145. The voltage from the gate 147 is applied to the adding circuit 116 along with the pulses from monostable multivibrator 104. Also, there is applied to the adding circuit 116 a negative-going voltage pedestal 161, FIG. 2, coincident in time with voltage 145 and of opposite polarity and equal amplitude. Voltage 161 cancels in the adding circuit 116 the voltage 145 which was employed to control gate 147 and thus eliminates the pedestal effect of the waveform 160 as it appears on line 162, leaving only the alternating current to be applied to the winding 121 on the hybrid coil 125.

Summarizing the foregoing, there is applied to the hybrid coil 125 the voltages illustrated by the waveforms 162 of FIG. 2. The first pulse 122 coincides with pulse 99. The second pulse 123 coincides with the trailing edge of the waveform 110. The A.C. voltage 160 appears only under the control of voltage 145. The two pulses 122 and 123 and the A.C. voltage 160 are applied to the coil 121 and thus coupled to the cable conductors 170 and 171.

Conductor 170 is connected to a series circuit comprising a winding 172 which in turn is connected to a winding 173, the latter being connected to the conductor 171. The juncture between the windings 172 and 173 is connected by way of switch 174 to the positive terminal of battery 175. The negative terminal of battery 175 is connected to ground. Conductors 170 and 171 form a part of the borehole cable and are encased within a conductive shield, indicated by the broken outline 176, which is connected to ground.

The hybrid coil 125 is of the type which will provide for a phantom circuit. A balancing network 180 coupled to the hybrid coil is designed to match the impedance of the line comprised of conductors 170 and 171, shielded by cable 176 as is well understood by those skilled in the art.

The foregoing description has related to the construction and operation of the surface portions of the system with particular reference to the generation of control functions and transmission of the same downhole.

The downhole system illustrated in FIG. 4 will now be described. This portion of the system is responsive to the above-described signals for carrying out certain operative functions contemplated by the present invention.

More particularly, the conductors 170 and 171 are terminated in a hybrid coil 200. Signals transmitted downhole appear across the winding 201 of the hybrid coil 200 and are applied by way of conductor 202 to the input of a triggered monostable multivibrator 203 and to the input of a buffer amplifier 204.

The triggered monostable multivibrator 203 has a time constant which is preset to be substantially longer than the duration of pulse 110, FIG. 2. The pulses 122 and 123 are applied to the multivibrator 203 through disconnect diodes 205 and 206. Multivibrator 203 includes a triode 207 whose collector is connected to diode 205. Triode 208 of multivibrator 203 has its collector connected to diode 206. The base of triode 207 is connected by way of condenser 209 to the base of a triode 210, forming a part of a blocking oscillator circuit. The blocking oscillator circuit includes a rectifier 211 and a parallel resistance 212 connected between the base of triode 210 and ground. The emitter of triode 210 is connected to a B+ terminal by way of winding 213. The collector of triode 210 is connected by way of winding 214 to a negative source of potential. The tertiary winding 215 of the blocking oscillator is connected by way of conductors 216 and 217 to a switching circuit 218. The switching circuit 218 is designed to control flow of D.C. current from a power supply 219 to the coil 20. Signals applied to switch 218 by way of conductors 216 and 217 serve to initiate current flow. The base of triode 208 is connected by way of conductor 220 to the input of a preset monostable multivibrator 221 and to the input of a second blocking oscillator including a triode 222. Blocking oscillator of triode 222 has the same structural features as the blocking oscillator of triode 210. The tertiary winding 223 is connected by way of conductor 224 to the control electrode of a controlled rectifier 226. The base of rectifier 226 is connected to ground, as is the second conductor 225 leading from winding 23. A series LC circuit 227 is connected across the controlled rectifier 226, as is a condenser 228.

Monostable multivibrator 221 includes triodes 230 and 231. The collector of triode 231 is connected by way of condenser 232 to a third blocking oscillator including a triode 234. The tertiary winding 235 is connected to a pulser circuit including controlled rectifier 236 which has a circuit the same as controlled rectifier 227.

Gate 218 includes both of the controlled rectifiers 240 and 241. The control electrodes of rectifiers 240 and 241 are connected to conductor 216 leading to the first blocking oscillator of triode 210. Rectifier 241 is connected at the anode thereof to coil 20 and thence to ground. The second terminal of rectifier 241 is connected by way of a choke 242 to the output terminal of power supply 219. The anode of rectifier 240 is connected to coil 20 by way of a resistor 243. The cathode of rectifier 240 is connected to the power supply 219 by way of choke 244. The output of the pulser circuit of controlled rectifier 226 is applied to the juncture between choke 242 and rectifier 241. The output of the pulser circuit of rectifier 236 is applied to the juncture between rectifier 240 and inductance 244.

The operation of the circuit of FIG. 4 thus far described is as follows. Application of pulse 122, FIG. 2, to the multivibrator 203 produces a voltage change at the base of triode 207 which is a positive voltage pedestal. The leading edge of this voltage pedestal is applied by way of condenser 209 to the blocking oscillator of triode 210 to produce a sharp voltage pulse in tertiary winding 215. The latter pulse applied to the control electrodes on the controlled rectifiers 240 and 241 serves to initiate flow of current from supply 219 through both rectifiers 240 and 241 to coil 20. Such current flow produces a unidirectional magnetic field of large magnitude represented in FIG. 2 by the waveform $H_{01}$. Application of the field $H_{01}$ serves to orient the nuclei within the influence of this field and to align them with the magnetic field. The magnetic field is maintained constant for the duration of the interval between pulses 122 and 123. Pulse 123 applied by way of rectifier 205 to the collector of triode 208 returns the triggered monostable multivibrator 203 to its stable state. A positive pulse appearing at the base of triode 207 is passed to ground by way of rectifier 211. The negative excursion appearing coincident with pulse 123 at the base of triode 208 is applied to the second blocking oscillator of triode 222 to trigger controlled rectifier 226. This applies a high-voltage pulse to the controlled rectifier 241 to turn the latter off and terminate current flow therethrough. Thus, the magnitude of the field $H_{01}$ is abruptly reduced, as indicated in FIG. 2, to the level of the field $H_{02}$. However, controlled rectifier 240 continues to conduct current from source 219 through coil 20 until turned off. Because of the presence of resistor 243, the current flow through controlled rectifier 240 is relatively small compared to current flow through rectifier 241. Thus, after rectifier 241 is turned off, the unidirectional magnetic field produced by coil 20; namely, the field $H_{02}$, is of relatively small magnitude. Rectifier 240 is turned off, thus returning field $H_{02}$ to zero in dependence upon operation of the multivibrator 221 and the blocking oscillator of triode 234. More particularly, the negative-going pulse appearing at the base of triode 208 coincident with pulse 123 is applied to monostable multivibrator 221 by way of conductor 220. The negative-going voltage at the collector of triode 231, generated when circuit 221 returns to its normal state, is applied to the blocking oscillator of triode 234. By this means, a high-power pulse is applied by way of controlled rectifier 236 to the controlled rectifier 240 to turn it off. Thus, the field $H_{02}$ is terminated.

Rectifiers 226 and 236 are each provided with a tuned circuit such as circuit 227 which, because of the oscillations therein when current flow is initiated in rectifier 226, serves to extinguish the same automatically.

Following removal of the field $H_{02}$, the nuclei under the influence of the fields $H_{01}$ and $H_{02}$ precess as an ensemble. The ensemble undergoes damped free Larmor precession. Individuals in the ensemble, because of inhomogeneities in the magnetic field, tend to become out of phase. The application of the field $H_{03}$, produced by application of the alternating current voltage 163 to coil 20, alters the phase relationships between the individuals of the ensemble so that after lapse of a time interval following removal of field $H_{03}$ the ensemble again will be in phase.

The A.C. voltage 160 is applied to buffer amplifier 204 and thence by way of conductor 260 and condenser 261 to the coil 20. The field $H_{03}$ has the same frequency as that of the nuclei in said ensemble as they precess in the earth's magnetic field.

Detector coils 21 and 22 are connected to the input circuit of a tuned amplifier 270. The output of amplifier 270 is applied to a conductor 271 which leads to winding 272 of the hybrid coil 200. Any signals detected in coils 21 and 22 may by this means be transmitted to the coil 200 and thence by way of conductors 170 and 171 to surface equipment. In order to avoid transmission of signals induced in coils 21 and 22 directly from current flow in coil 20, there is provided a gate control circuit which includes a clipper 275 and an inverter 276. The positive and negative outputs of inverter 276 are applied by way of a dual-diode, gate control circuit 277 to control the gain of the tuned amplifier 270. The clipper 275 is so designed to produce approximately the same output voltage in response to high-amplitude current flow through coil 20 for production of field $H_{01}$ as upon production of the fields $H_{02}$ and $H_{03}$. By this means, it is assured that signals induced in coils 21 and 22 by energization of coil 20 will not be transmitted uphole.

The RC circuit 278 of clipper circuit 275 has a time constant sufficiently long that the gain of amplifier 270 will remain suppressed for a short period after removal of fields $H_{02}$ and $H_{03}$. Thereafter, any nuclear precession signals detected by coils 21 and 22 will be amplified in amplifier 270 and in any succeeding stages 270a for transmission to the earth's surface.

At the surface of the earth, the signals on conductors 170 and 171, FIG. 3, are induced in the winding 300 of the hybrid coil 125. Coil 300 has one terminal connected to ground and the other terminal to a rectifier circuit 301. The output of circuit 301 is connected by way of conductor 302 to the signal input terminal of a suitable indicating means 304 such as an oscilloscope. Conductor 302 is illustrated as connected to the vertical input terminal.

The horizontal input terminal of oscilloscope 204 is connected by way of conductor 205 to the collector of triode 101 in the timer circuit 100, thereby to trigger the sweep of the oscilloscope 204. By this means, there may be portrayed the signals induced in winding 300 from the downhole unit.

Signals of interest from the downhole unit will include a free-decay signal 350, FIG. 2, such as produced by the damped free Larmor precession. The alternating components of this signal may be rectified to produce a unidirectional function 351. Similarly, following removal of the alternating field $H_{03}$, a free-decay signal 352 may be observed. In addition, an echo signal 353 appears in the form of a damped echo pulse centered at a time $t_3$ after removal of the field $H_{03}$, where $t_3$ is the same as the interval between the termination of the D.C. field $H_{02}$ and application of the alternating field $H_{03}$.

In order to determine the parameters of interest qualitatively, and in some cases even quantitatively, it may be desirable to register the entire waveform of the resonance signals as they appear on the oscilloscope 304 and analyze such waveforms in detail. In order to determine either of the relaxation times or diffusion constant, as hereinafter discussed, it will be necessary to obtain measurements in at least two domains. With respect to measurement of $T_1$, measurements would be made of the amplitude of the function 352, FIG. 2, for two values of either time $t_1$ or time $t_3$. Similarly, determination of $T_2$ would be accomplished by measurement of the function 353 for two values of $t_1$ or $t_3$. Determination of the diffusion constant D would result from measurements of function 353 for two values of excitation of coil 23.

Figure 6:
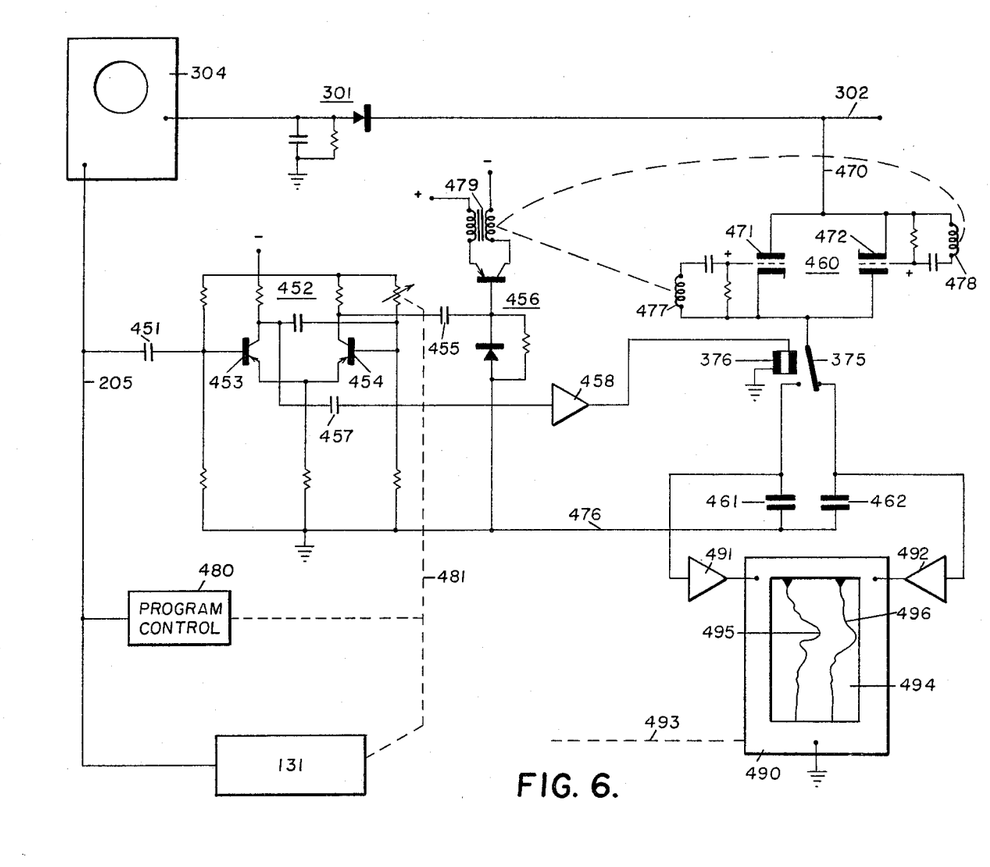
FIG. 6 is a schematic diagram of a measuring system.

In any of the foregoing cases where two such measurements are made, it may be possible to plot the magnitude of the measured function versus depth employing the recording system 450, shown in block form in FIG. 3 and shown in detail in FIG. 6.

Referring to FIG. 6, the timing signal on conductor 205 is applied by way of condenser 451 to a monostable multivibrator 352. The circuit 452 is similar in construction and operation to circuit 131 of FIG. 3. Included are a pair of triodes 453 and 454. The collector of triode 454 is connected by way of condenser 455 to the input of a blocking oscillator 456. The collector of triode 453 is connected by way of condenser 457 to the input of an amplifier 458. The blocking oscillator 456 and amplifier 458 serve to control operation of a peak reading voltage meter unit which includes a dual triode clamp circuit 460 and a pair of storage condensers 461 and 462. More particularly, the signal voltage appearing on conductor 302 is applied by way of conductor 470 and the bi-laterally conductive, normally open, dual triode clamp 460 to condensers 461 and 462 on alternate cycles of operation of the monostable multivibrator 452. Circuit 460 in the form of a dual triode clamp has the anode of a triode 471 connected to the cathode of a triode 472 and to conductor 470. The remaining cathode and plate are connected directly together and are in turn connected by way of a stepping relay 475 to condensers 461 and 462. Condensers 461 and 462 are connected to the ground bus 476. The grid circuits of triodes 471 and 472 are independently coupled by means of secondary windings 477 and 478, respectively, to the output transformer 479 of the blocking oscillator 456. Windings 477 and 478 form portions of the blocking oscillator output transformer 479.

Production of a pulse as upon actuation of blocking oscillator 456 drives both of the grids of tubes 471 and 472 sufficiently positive to permit flow of current in either direction to or from condensers 461 or 462 depending upon the algebraic sum of the voltage on a given condenser and the voltage between conductor 302 and ground 476. The output of amplifier 458 is connected to the coil 476 of relay 475 so that upon each actuation of multivibrator 452 the switch circuit 460 is connected by relay 475 first to one and then to the other of condensers 461 and 462.

A program control unit 480 connected to conductor 205 is adapted to alter the time constant of multivibrators 131 and 452 by means of the coupling 481. By this means, the time $t_1$, FIG. 2, may be varied cyclically between two values by adjustment of multivibrator 131. Synchronously, adjustment will be made in the time at which the switch 460 will be rendered conductive to sample the received signal appearing on conductor 302 and to store on condensers 461 and 462 electrical charges proportional to the magnitudes of such function for two different values of time $t_1$. By adjustment of multivibrator 452, the voltage level of the received signal may be sampled immediately following termination of the field $H_{03}$, FIG. 2, or at the peak value of the function 353.

As the resonance signals vary with depth in the borehole, the voltages developed across condensers 461 and 462 will vary. Such voltages may then be registered on recorder 490 which is illustrated as a dual pen recorder. It is coupled at a first input to condenser 461 by way of a buffer amplifier 491. A circuit is completed from condenser 462 to a second input by way of buffer amplifier 492. Amplifiers 491 and 492 preferably have very high input impedance in order to retain the charges on condensers 461 and 462 and thus permit such charges to change only in response to changes in the signal appearing on conductor 302.

Recorder 490 is coupled mechanically as by link 493 to the sheave 13, FIG. 1, or to a suitable generator of a related driving function so that the length of the chart 494 on recorder 490 will be depth dependent. The traces 495 and 496 will then represent the magnitude of the desired function for each of two different conditions respectively.

By suitable selection of circuit components, any one of the desired functions above and hereinafter discussed may be portrayed on recorder 490 as a continuous function or may be registered in minute detail as to waveform through a photographic record of the signal appearing on oscilloscope 304.

Nuclei having a magnetic moment and located in the field of influence of coil 20, such as hydrogen, normally are under the influence of the earth's magnetic field which is relatively low in magnitude, being of the order of approximately one-half gauss. The earth's magnetic field is continuously effective in its control of the protons therein. The protons acquire a nuclear polarization having a population P which is proportional to:

$$P \alpha N H_e / T \tag{1}$$

where:

N is the number of protons,
T is the absolute temperature of the sample, and
$H_e$ is the magnitude of the earth's magnetic field.

At time zero in FIG. 2, the large magnetic field $H_{01}$ is applied to a region wherein such protons are located. The field $H_{01}$ is very much larger than $H_e$, preferably of the order of 500 gauss. Because of the orientation of coil 20, the field $H_{01}$ is at an effective angle with respect to $H_e$. As time passes under the influence of the field $H_{01}$, the protons acquire a polarization population proportional to:

$$P \alpha \frac{N H_{01}}{T} \left(1 - e^{\frac{-t}{T_1}}\right) \tag{2}$$

where:

$T_1$ is the spin-lattice or longitudinal relaxation time of the protons, and
$t$ is the duration of the high-magnitude magnetic field.

In accordance with the present invention, when time $t$ equals $t_1$, the unidirectional magnetic field is abruptly decreased to a relatively low value $H_{02}$, FIG. 2, and is maintained for a predetermined time interval. Preferably, the magnitude of the field $H_{02}$ is of the order of ten times the magnitude of the earth's magnetic field $H_e$, and thus the field is of low intensity but of magnitude greater than the earth's magnetic field. The field $H_{02}$ is maintained constant for the time interval $t_2$, a necessary condition being that $t_2$ is very much shorter than either $T_1$ or $t_1$. At the end of the interval $t_2$, the field $H_{02}$ is abruptly removed.

The ensemble of nuclei undergoing damped free Larmor precession induces a signal in coils 21 and 22. The frequency of precession of the ensemble, and thus the frequency of the signal, may be expressed as follows:

$$f = \gamma H_e / 2\pi \tag{3}$$

where:

$\gamma$ is the gyromagnetic ratio for the precessing nuclei which, in general, in the earth formations will be hydrogen.

The amplitude of this signal immediately following removal of field $H_{02}$ is proportional to:

$$A_1 = \frac{N H_{01}}{T} \left(1 - e^{\frac{-t_1}{T_1}}\right) \sin \theta \tag{4}$$

where:

$\theta$ is the angle between the directions of the fields $H_e$ and $H_{01}$.

The amplitude A decays from its value $A_1$ with time because of the presence of magnetic field inhomogeneities and the spin-spin or transverse relaxation $T_2$. The effect of inhomogeneities and $T_2$ on the amplitude as a function of time A(t) may be expressed as follows:

$$A(t) = A_1 e^{-[(t-t_1-t_2)/T_2]} f(\Delta H_e, t) \tag{5}$$

The last term of the above expression, namely, $f(\Delta H_e, t)$, describes the amplitude decay resulting from inhomogeneities. If the inhomogeneities are small compared to the parameter $(\gamma T_2)$, then the spin-spin relaxation time $T_2$ may be determined by measuring the time constant of variations in the amplitude A(t) as a function of time $t$.

In accordance with the present invention, the measurement of the amplitude of the function 352 is contemplated. Further in accordance with the present invention, the measurement of the signal resulting from individuals of the precessing ensemble becoming in phase, as represented by the function 353, FIG. 2, is to be measured. This will provide an accurate measure of $T_2$, where, as is usually the case, field inhomogeneities are not negligible.

More particularly, the alternating field $H_{03}$, FIG. 2, is applied at a time $t = t_1 + t_2 + t_3$ and is maintained for a period of duration $t_4$. The alternating field $H_{03}$ is applied at a substantial angle with respect to the earth's magnetic field $H_e$ through energization of coil 20; and its frequency is equal to the frequency $f$, the proton resonance frequency in the earth's magnetic field $H_e$. The magnitude of the alternating magnetic field is:

$$H_{03} = 2H_1 \cos (2\pi f t) \tag{6}$$

where:

$2H_1$ is the maximum amplitude of the applied alternating field.

The free-nuclear precession echo signal represented by the function 353, FIG. 2, after field $H_{03}$ is removed may be expressed as follows:

$$E_{353} = \frac{N H_{01}}{T} \left(1 - e^{\frac{-t_1}{T_1}}\right) \sin \theta e^{-(-2t_3-t_4-t_1-t_2)/T_2} f'(\Delta H_e, t) \tag{7}$$

The above expression is valid under the conditions where:

$\gamma H_e \gg (T_2)^{-1}$,
$H_e \ll H_{02}$, and
$t_4 = \pi/(\gamma H_1) \sin \phi$, the angle $\phi$ being the angle between the earth's field and the impressed alternating field.

The maximum value of the voltage $E_{353}$ (which occurs at time $t = 2t_3 + t_4 + t_1 + t_2$) will vary in dependence upon $t_3$ in a manner such that the spin-spin relaxation time $T_2$ may be determined.

The spin-lattice relaxation time $T_1$ may readily be determined through the use of field $H_{03}$ by repeatedly applying a sequence of signals $H_{01}$, $H_{02}$, and $H_{03}$, while maintaining all field values constant as well as times $t_2$, $t_3$, and $t_4$. As $t_1$ is varied from one cycle to another, variations will be produced in signal 353 to provide a basis for the determination of the relaxation time $T_1$ from Equation 7.

The sequence of operations to which Equation 7 pertains may allow for the determination of the diffusion constant D of the molecules containing the precessing nuclei. This involves the application of the field gradient by energizing coil 23 so that the resultant magnetic field has at least a component which is parallel to the direction of the earth's magnetic field. Under these conditions, the terms $f'(\Delta H_e, t)$ from Equation 7 may be replaced by an exponential function having a more exact for as follows:

$$e^{-\left[\frac{2}{3}\gamma G_e^2 t_3^3 D\right]}$$

where D is the diffusion constant and $G_e$ is the component in the direction of $H_e$ of the magnetic field gradient. When the foregoing exponent is not small compared to unity, the application of the field gradient G causes a reduction of the amplitude $A_1$ of the free precession echo signal. Measurement of the amplitudes A of the pulse echo signals 353, 354 as a function of the magnitude of current in coil 23 and as a function of depth will yield information to distinguish between oil and water. Crude oil has been found to have a diffusion constant of the order of $2 \times 10^{-6}$ cm.$^2$/sec. and water is known to have a diffusion constant of the order of $2.3 \times 10^{-5}$ cm.$^2$/sec. With diffusion constants of representative crude oils and water differing one from the other by about one order of magnitude, it will be possible to distinguish between crude oil and water upon measurement of this characteristic of nuclei precessing under the influence of a magnetic field. The heavier the crude oil, the greater will be the difference between the diffusion constants, thus more readily permitting distinction.

The diffusion constant therefore can be found by measuring the amplitude of the echo signal first without energizing coil 23 and then with coil 23 energized. The ratio of the amplitudes thus measured is equal to the value of the foregoing exponent from which D may be determined. Alternatively, the value of the diffusion constant D may be obtained by maintaining excitation of coil 23 constant and measuring the echo amplitude for various values of $t_3$ and then applying the exponential expression $$e^{-\left[\frac{2}{3}\gamma G_e^2 t_3^3 D\right]}$$

to the resultant measurements. A condition for either of the foregoing procedures, however, is that $G_e a < H_{03}$, where $a$ is the dimension along the earth's magnetic field of the zone from which protons contribute to the measurement. Thus, in the unit 304 there may be produced a signal indication representative of the amplitude of the function 352 or of the amplitude of the function 353, or both, as they vary both with depth and with the time intervals $t_1$ and $t_3$, respectively. Variations in such signals may then be employed to indicate the character of the fluids in the adjacent formations by determination from the observed signals an indication of one, or both, relaxation times.

In still a further aspect of the invention, measurements of the function 353 are repeatedly obtained while varying in a known manner the excitation of the fourth coil 23, FIG. 1. This coil is controlled, as illustrated in FIGS. 3 and 4, by the closure of switch 174, FIG. 3, which serves to energize relay coil 310 to move the armature 311 from the open circuit terminal 312 to the remaining terminals. Such operation causes current to flow through coil 23 of varying magnitudes so that the magnetic field in which nuclei precess following removal of the field $H_{03}$ may be varied as to inhomogeneity. Signal 353 will thus be changed in amplitude; the greater the inhomogeneity, the greater the reduction in amplitude of the function 353. One such example has been illustrated by the dotted curve 354 which is representative qualitatively of the change produced merely by energizing coil 23.

Thus, in accordance with the present invention, there is measured a characteristic of the relaxation time of protons precessing in the earth's magnetic field in an ensemble which is altered by application of an anternating magnetic field. Further, in accordance with the invention, the changes introduced in the precessing ensemble by variation of the inhomogeneities of the field in which the ensemble precesses yield information for the determination of the diffusion constant. Where an ensemble of protons is precessing under the influence of the earth's magnetic field, applicants apply alternating magnetic fields having the same frequency as the precessing ensemble following the establishment of each precessing ensemble. The magnetic fields alter to at least two different degrees the phase relation between individuals in the ensemble so that resultant signals detected in response to the precessing ensemble after removal of the magnetic fields permit determination of the relaxation time of the protons within and surrounding the wellbore. The present invention therefore relates to the method and system for studying precessing protons in the earth's magnetic field as altered by an alternating magnetic field.

Having described the invention in connection with certain specific embodiments thereof, it is to be understood that further modifications may now suggest themselves to those skilled in the art and it is intended to cover such modifications as fall within the scope of the appended claims.

What is claimed is:

1. A nuclear magnetic resonance logging system which comprises:
    (a) an exploring unit adapted to be positioned at selected depths in a wellbore,
    (b) a field coil in said unit,
    (c) means for applying a relatively high current in said field coil to produce a polarizing magnetic field successively at each of said depths in a substantially horizontal direction to and beyond the walls of said wellbore,
    (d) means for abruptly changing said high current to a reduced level for maintaining for a predetermined period the magnitude of said polarizing magnetic field at a level of the order of about ten times the earth's magnetic field,
    (e) means for exciting said field coil with alternating current to produce an alternating magnetic field beginning at the expiration of an interval following the abrupt decrease of said high current about equal to the transverse relaxation time of water, and
    (f) means for measuring the amplitude of the Larmor precession signal from precessing nuclei in the earth's magnetic field beginning a like interval after application of said alternating magnetic field.

2. The combination set forth in claim 1 wherein there is a means for applying a field gradient along the direction of the earth's magnetic field for varying the amplitude of said Larmor precession.

3. In a nuclear magnetic resonance well logging system, the combination which comprises:
    (a) an elongated tubular probe unit,
    (b) a primary field coil having its axis normal to the axis of said unit,
    (c) a secondary field coil having its axis perpendicular to the axis of said primary field coil,
    (d) detecting-coil means adjacent to said primary field coil,
    (e) means for selectively applying unidirectional current to both said primary and secondary field coils for establishing a polarization condition of fluids within and surrounding the wellbore and for controlling precession thereof in the earth's magnetic field, (f) means for applying alternating current to said primary field coil in time-spaced relation with respect to excitation thereof by said unidirectional current for altering the precession of said protons, and (g) means connected to said detecting-coil means for registering as a function of depth the signals induced in said detecting-coil means following application of said alternating current to said primary field coil.

4. In a nuclear magnetic resonance well logging system, the combination which comprises:
  (a) an elongated tubular probe unit,
  (b) a primary field coil having its axis normal to the axis of said unit,
  (c) a secondary field coil having its axis perpendicular to the axis of said primary field coil,
  (d) detecting-coil means oriented perpendicular with respect to the axis of said primary field coil;
  (e) means for selectively applying unidirectional current to both said primary and secondary field coils for establishing a polarization condition of fluids within and surrounding the wellbore and for controlling precession thereof in the earth's magnetic field,
  (f) means for applying alternating current to said primary field coil in time-spaced relation with respect to excitation thereof by said unidirectional current for altering the precession of said protons, and
  (g) means connected to said detecting-coil means for registering as a function of depth the signals induced in said detecting-coil means in the interval after application of said alternating current to said primary field coil.

5. A nuclear magnetic resonance logging system which comprises:
  (a) an exploring unit and cable means for supporting said unit at selected depths in a wellbore,
  (b) an elongated field coil supported in said unit with its axis horizontal,
  (c) a pair of detector coils supported in said unit with their axes horizontal and mutually perpendicular one with respect to the other,
  (d) a source of unidirectional current,
  (e) a source of alternating current of Larmor frequency of protons in the earth's field in the region of said wellbore,
  (f) a measuring system at the earth's surface connected to said cable means for recording as a function of depth signals transmitted from said unit to the earth's surface, and
  (g) a control system interconnecting said cable means, both sources, and said measuring system, programmed to apply at each of a plurality of depths in said wellbore in a first sequence high intensity unidirectional current to said field coil for a first predetermined interval and then for a third predetermined interval following removal of said current by a second predetermined interval applying alternating current to said field coil, and for applying said signals to said measuring system following termination of said third interval, and for thereafter applying a like sequence with said second interval thereof altered from the value of said second interval in said first sequence.

6. A nuclear magnetic resonance logging system which comprises:
  (a) an elongated non-magnetic pressure resistant exploring unit and cable means for supporting said unit at selected depths in a wellbore,
  (b) an elongated field coil supported in said unit with its axis horizontal,
  (c) a pair of detector coils supported at the axis of said field coil in said unit with their axes horizontal and mutually perpendicular one with respect to the other,
  (d) a source of unidirectional current,
  (e) a source of alternating current of Larmor frequency of protons in the earth's field in said wellbore,
  (f) a recording system at the earth's surface connected to said cable means for recording as a function of depth signals transmitted from said unit to the earth's surface, and
  (g) a control system interconnecting said cable means, both sources, and said recording system, programmed to apply at each of a first sequence high intensity unidirectional current to said field coil for a first predetermined interval, and then for a third predetermined interval following removal of said current by a second predetermined interval applying alternating current to said field coil, and for applying said signals to said recording system following termination of said third interval, and for thereafter applying a second like sequence with the second interval altered from the value of said second interval in said first sequence.

7. A nuclear magnetic resonance logging system which comprises:
  (a) an exploring unit adapted to be positioned at selected depths in a wellbore,
  (b) a field coil in said unit,
  (c) means for applying a relatively high current in said field coil to produce a polarizing magnetic field successively at each of said depths in a substantially horizontal direction to and beyond the walls of said wellbore,
  (d) means for abruptly changing said high current to a reduced level for maintaining for a predetermined period the magnitude of said polarizing magnetic field at a level of the order of about ten times the earth's magnetic field,
  (e) means for exciting said field coil with a pulse of current to produce an alternating magnetic field beginning at the expiration of a predetermined interval following the abrupt decrease of said high current, and
  (f) means for measuring the amplitude of the Larmor precession signal from precessing nuclei in the earth's magnetic field beginning a like interval after application of said alternating magnetic field.

8. A nuclear magnetic resonance logging system which comprises:
  (a) an exploring unit adapted to be positioned at selected depths in a wellbore,
  (b) a field coil in said unit,
  (c) means for applying a relatively high current in said field coil to produce a polarizing magnetic field successively at each of said depths in a substantially horizontal direction to and beyond the walls of said wellbore,
  (d) means for abruptly changing said high current to a reduced level for maintaining for a predetermined period the magnitude of said polarizing magnetic field at a level of the order of about ten times the earth's magnetic field,
  (e) means for exciting said field coil with a pulse of current to produce an alternating magnetic field beginning at the expiration of an interval following the abrupt decrease of said high current about equal to the transverse relaxation time of water, and
  (f) means for measuring the amplitude of the Larmor precession signal from precessing nuclei in the earth's magnetic field beginning a like interval after application of said alternating magnetic field.

9. A nuclear magnetic resonance logging system which comprises:
  (a) an exploring unit adapted to be positioned at selected depths in a wellbore,
  (b) a field coil in said unit,
  (c) means for applying a relatively high current in said field coil to produce a polarizing magnetic field successively at each of said depths in a substantially horizontal direction to and beyond the walls of said wellbore,
(d) means for abruptly changing said high current to a reduced level for maintaining for a predetermined period the magnitude of said polarizing magnetic field at a level of the order of about ten times the earth's magnetic field,
(e) means for exciting said field coil with current which includes uniformly spaced current excursions of at least one polarity to produce pulsed magnetic fields beyond the walls of said wellbore in the interval following removal of the polarizing current from said field coil including a time about equal to the transverse relaxation time of water, and
(f) means for detecting the Larmor precession signal from nuclei precessing in the earth's magnetic field in the interval after generation of said pulsed magnetic fields.

10. A nuclear magnetic resonance logging system which comprises:
(a) an exploring unit adapted to be positioned at selected depths in a wellbore,
(b) a field coil in said unit,
(c) means for applying a relatively high current in said field coil to produce a polarizing magnetic field successively at each of said depths in a substantially horizontal direction to and beyond the walls of said wellbore,
(d) means for abruptly changing said high current to a reduced level for maintaining for a predetermined period the magnitude of said polarizing magnetic field at a level of the order of about ten times the earth's magnetic field,
(e) means for exciting said field coil with repeated pulses of current to produce pulsed magnetic fields at predetermined intervals following the abrupt decrease of said high current, and
(f) means for measuring the amplitude of the Larmor precession signal from precessing nuclei in the earth's magnetic field in the interval after application of said magnetic fields.

11. A nuclear magnetic resonance logging system which comprises:
(a) an exploring unit adapted to be positioned at selected depths in a wellbore,
(b) a field coil in said unit,
(c) means for applying a relatively high current in said field coil to produce a polarizing magnetic field successively at each of said depths in a substantially horizontal direction to and beyond the walls of said wellbore,
(d) means for abruptly changing said high current to a reduced level for maintaining for a predetermined period the magnitude of said polarizing magnetic field at a low level but greater than the earth's magnetic field,
(e) means for exciting said field coil with alternating current to produce an alternating magnetic field beginning at the expiration of an interval following the abrupt decrease of said high current about equal to the transverse relaxation time of water, and
(f) means for measuring the amplitude of the Larmor precession signal from precessing nuclei in the earth's magnetic field beginning a like interval after application of said alternating magnetic field.

12. A nuclear magnetic resonance logging system which comprises:
(a) an exploring unit adapted to be positioned at selected depths in a wellbore,
(b) a field coil in said unit,
(c) means for applying a relatively high current in said field coil to produce a polarizing magnetic field successively at each of said depths in a substantially horizontal direction to and beyond the walls of said wellbore,
(d) means for abruptly changing said high current to a reduced level for a predetermined period for maintaining the polarization of nuclei established by said polarizing magnetic field,
(e) means for exciting said field coil with pulsed alternating current to produce an alternating magnetic field beginning at the expiration of a predetermined interval following the abrupt decrease of said high current, and
(f) means for measuring the amplitude of the Larmor precession signal from precessing nuclei in the earth's magnetic field a like interval after application of said alternating magnetic field.

References Cited by the Examiner

UNITED STATES PATENTS

| | | | |
|---|---|---|---|
| 2,887,673 | 5/1959 | Hahn | 324—0.5 X |
| 2,968,761 | 1/1961 | Zimmerman et al. | 324—0.5 |
| 2,999,204 | 9/1961 | Jones et al. | 324—0.5 |
| 3,025,457 | 3/1962 | Bloom | 324—0.5 |
| 3,128,425 | 4/1964 | Codrington | 325—0.5 |

OTHER REFERENCES

Powles et al.: (1) Archives des Sciences, Colloque Ampere, vol. 11, July 1958, pp. 209–214 (QC–770–C6); (2) Nature, vol. 180, No. 4598, Dec. 14, 1957, pp. 1344–1345, (Q–1–N2).

Carr et al.: Physical Review, vol. 94, No. 3, May 1 1954, pp. 630–638.

References Cited by the Applicant

UNITED STATES PATENTS 3,019,383  1/1962  Varian.

FOREIGN PATENTS 586,235  11/1959  Canada.
1,141,373  3/1957  France.
1,015,954  9/1957  Germany.

OTHER REFERENCES

Bloom et al.: Physical Review, vol. 93, No. 4, Feb. 15, 1954, page 941.

Bloom: Journal of Chemical Physics, vol. 25, No. 4 October 1956, pp. 793 and 794.

Brown et al.: Journal of Petroleum Technology, vol. 8, November 1956, pp. 262 to 264.

Zimmerman et al.: Journal of Physical Chemistry, vol. 60, No. 8, September 1956, pp. 1157 to 1161.

Douglas et al.: The Journal of Physical Chemistry, vol. 62, No. 9, September 1958, pp. 1102 to 1107.

Powles et al.: Archives des Sciences, 8 Colloque Ampere, vol. 12 (Special edition), April 1959, pp. 135 to 140.

CHESTER L. JUSTUS, *Primary Examiner.*

MAYNARD R. WILBUR, *Examiner.*